A. BARTELS.
NOZZLE OF PRESSES FOR MOLDING PLASTIC MATERIALS.
APPLICATION FILED MAR. 27, 1915.
1,171,382. Patented Feb. 8, 1916.
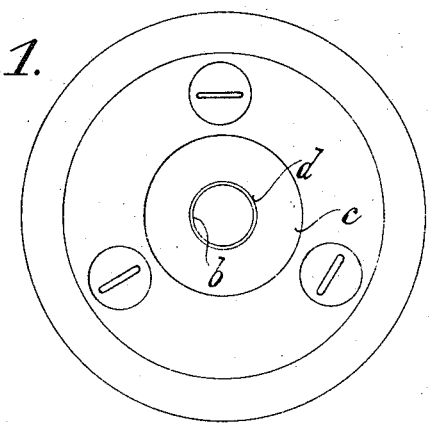
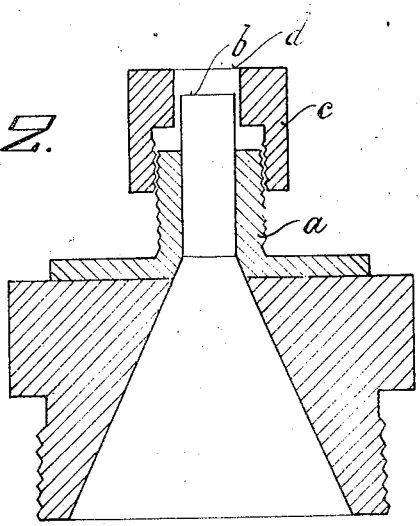
Inventor
A. Bartels
By
Atty.

UNITED STATES PATENT OFFICE.

AMANDUS BARTELS, OF HARBURG-ON-THE-ELBE, GERMANY.

NOZZLE OF PRESSES FOR MOLDING PLASTIC MATERIALS.

1,171,382. Specification of Letters Patent. Patented Feb. 8, 1916.

Application filed March 27, 1915. Serial No. 17,514.

*To all whom it may concern:*

Be it known that I, AMANDUS BARTELS, a subject of the King of Prussia, residing at Buxtehuderstrasse 102, Harburg-on-the-Elbe, in the Kingdom of Prussia, German Empire, have invented certain new and useful Improvements in Nozzles of Presses for Molding Plastic Materials, of which the following is a specification.

In the usual method of molding plastic materials the material which has previously been rendered plastic, is placed in special molding presses having nozzles which determine the shape of the extruded material. Such molding presses are employed more particularly for molding the plastic material into the shape of strings or rods. The orifice of the nozzle is usually circular.

The production of plastic materials and the molding of the same by means of a nozzle may also be combined in one and the same operation. The molding process is then exactly the same, the material which has been rendered plastic being pressed out through the nozzle.

In the case of many plastic materials the conversion of which into the desired shape, and especially the shape of a rod, is effected by great pressure, it has been noticed that the resulting rod is larger in diameter than the nozzle. Therefore, in order to mold such plastic materials into the form of rods of determined diameter, that circumstance must be taken into consideration, that is to say, a nozzle of correspondingly smaller diameter must be used.

The behavior of one and the same material varies very considerably with a small difference of temperature and with small differences in its elasticity, and even with differences in the degrees of heating the outlet orifice where such heating is necessary. Since the temperature and pressure conditions may vary during one and the same operation, it is impossible when working on a large scale, always to produce uniform rods with one and the same nozzle. I have now found that this drawback disappears if a second nozzle having a slightly large outlet orifice is combined with the first nozzle. This second larger nozzle may be mounted movable in front of the first nozzle, for instance, by making the second nozzle in the form of a screw-threaded cap screwing upon the first nozzle.

I have found that the effect of the second larger outlet orifice upon the subsequent thickening of the extruded rods varies with the distance of the first smaller outlet orifice from the said second larger outlet orifice. Any differences which may still appear when the material is being extruded, may be removed by a simple adjustment of the front outlet orifice. This double nozzle may also be employed for producing rods of different thicknesses by suitably adjusting the distance of the front larger outlet orifice from the first smaller outlet orifice. Thus with a very much smaller stock of nozzles it is possible to produce rods of any desired thickness from the material by using the improved molding press.

All other conditions being alike, the second or front outlet orifice will produce a rod of larger diameter than when only the first nozzle having a smaller outlet orifice is used, that is to say, the provision of the second nozzle having a slightly larger outlet orifice increases the tendency of the extruded rods to become thicker subsequently. Within certain limits the action of the front nozzle having a slightly larger outlet orifice, upon the subsequent thickening of the rods, is increased by increasing its distance from the first or front outlet orifice. Consequently if it is desired to reduce the diameter of the rod, it is merely necessary to move the outer outlet orifice nearer to the smaller outlet orifice of the first nozzle. Vice versa, the outlet orifice of the front movable nozzle should be moved away from the outlet orifice of the first nozzle when it is desired to increase the diameter of the extruded rod. The exact proportion between the diameters of the two outlet orifices can be determined by experience. The second outlet orifice may have a larger or smaller diameter according as the material increases more or less in thickness on passing out of the first outlet orifice. The diameter of the second outlet orifice must always be kept within the limits of the tendency of the rod to become thicker on issuing from the first outlet orifice. In other words: The second outlet must be smaller than the thickness assumed by the rod on issuing from the first outlet orifice.

A third nozzle, or any desired number of nozzles of gradually increasing sizes may be arranged one in front of the other, for the purpose of increasing the diameter of the extruded rod. Thus, the use of additional nozzles allows of effecting within certain limits, the same result as that produced by the use for a number of nozzles each having an outlet orifice of different diameter, used separately.

The accompanying drawings illustrate by way of example a construction of the improved nozzle wherein the second nozzle arranged in front of the first nozzle is capable of adjustment relatively to the latter by means of screw-thread.

Figure 1 is a front view and Fig. 2 is a cross section of the improved nozzle.

The first nozzle $a$ has the smaller outlet orifice $b$. The second nozzle $c$ having the front and slightly larger outlet orifice $d$ is mounted on the first nozzle. The remaining features are clearly shown in the drawings.

I claim:

1. A nozzle for presses for molding plastic materials, comprising a second nozzle having a slightly larger outlet orifice arranged in front of the ordinary nozzle of the press, for the purpose of molding the plastic material into rods of determined uniform thickness, substantially as described.

2. A nozzle for presses for molding plastic materials, comprising a second nozzle having a slightly larger outlet orifice arranged in front of the ordinary nozzle of the press, the said second nozzle being adjustably arranged in front of the first nozzle, substantially as described.

3. A nozzle for presses for molding plastic materials comprising a second nozzle having a slightly larger outlet orifice arranged in front of the ordinary nozzle of the press and being adjustably arranged by means of screw-thread, for the purpose of molding the plastic material into rods of determined uniform thickness, substantially as described.

In testimony whereof I affix my signature in presence of two witnesses.

Dr. AMANDUS BARTELS.

Witnesses:
 FRANCIS R. STEWART,
 CHARLES A. HALLEY.